US008001414B2

(12) United States Patent
Bensinger

(10) Patent No.: US 8,001,414 B2
(45) Date of Patent: Aug. 16, 2011

(54) DATA TRANSFER AND RECOVERY SYSTEM

(75) Inventor: Andrew Gideon Bensinger, Rockville, MD (US)

(73) Assignee: DSSDR, LLC, Windermere, FL (US)

( * ) Notice: Subject to any disclaimer, the term of this patent is extended or adjusted under 35 U.S.C. 154(b) by 0 days.

(21) Appl. No.: 12/364,461

(22) Filed: Feb. 2, 2009

(65) Prior Publication Data
US 2010/0005337 A1   Jan. 7, 2010

Related U.S. Application Data

(63) Continuation of application No. 11/769,544, filed on Jun. 27, 2007, now Pat. No. 7,487,383.

(60) Provisional application No. 60/817,211, filed on Jun. 29, 2006.

(51) Int. Cl.
*G06F 11/00* (2006.01)
(52) U.S. Cl. ........................................................ 714/4
(58) Field of Classification Search .................. 714/2–8, 714/13, 15–20, 39, 42, 54, 4.1, 4.11, 4.12, 714/4.2, 4.3, 4.4, 6.11, 6.12, 6.13, 6.23, 6.3, 714/6.31, 6.32, 12–16
See application file for complete search history.

(56) References Cited

U.S. PATENT DOCUMENTS

| 5,089,958 | A | 2/1992 | Horton et al. |
|---|---|---|---|
| 5,537,533 | A | 7/1996 | Staheli et al. |
| 5,774,660 | A | 6/1998 | Brendel et al. |
| 5,781,703 | A | 7/1998 | Desai et al. |
| 5,852,724 | A | 12/1998 | Glenn et al. |
| 5,917,997 | A | 6/1999 | Bell et al. |
| 5,987,621 | A | 11/1999 | Duso et al. |
| 6,078,957 | A | 6/2000 | Adelman et al. |
| 6,119,244 | A | 9/2000 | Schoenthal et al. |
| 6,144,999 | A | 11/2000 | Khalidi et al. |
| 6,145,094 | A | 11/2000 | Shirriff et al. |
| 6,148,383 | A | 11/2000 | Micka et al. |
| 6,163,856 | A | 12/2000 | Dion et al. |
| 6,247,139 | B1 | 6/2001 | Walker et al. |
| 6,269,431 | B1 * | 7/2001 | Dunham ........................ 711/162 |

(Continued)

OTHER PUBLICATIONS

The International Search Report, issued in the related International Application No. PCT/US07/72331, mailed on Jun. 18, 2008.

*Primary Examiner* — Nadeem Iqbal
(74) *Attorney, Agent, or Firm* — Morris & Kamlay LLP

(57) ABSTRACT

A backup image generator can create a primary image and periodic delta images of all or part of a primary server. The images can be sent to a network attached storage device and a remote storage server. In the event of a failure of the primary server, the failure can be diagnosed to develop a recovery strategy. Based on the diagnosis, at least one delta image may be applied to a copy of the primary image to generate an updated primary image at either the network attached storage or the remote storage server. The updated primary image may be converted to a virtual server in a physical to virtual conversion at either the network attached storage device or remote storage server and users may be redirected to the virtual server. The updated primary image may also be restored to the primary server in a virtual to physical conversion. As a result, the primary data storage may be timely backed-up, recovered and restored with the possibility of providing server and business continuity in the event of a failure.

27 Claims, 4 Drawing Sheets

U.S. PATENT DOCUMENTS

| | | | |
|---|---|---|---|
| 6,292,905 B1 | 9/2001 | Wallach et al. | |
| 6,304,980 B1 * | 10/2001 | Beardsley et al. | 714/6 |
| 6,324,161 B1 | 11/2001 | Kirch et al. | |
| 6,360,306 B1 * | 3/2002 | Bergsten | 711/162 |
| 6,609,213 B1 | 8/2003 | Nguyen et al. | |
| 6,691,245 B1 * | 2/2004 | DeKoning | 714/6 |
| 6,694,447 B1 | 2/2004 | Leach et al. | |
| 6,859,834 B1 | 2/2005 | Arora et al. | |
| 6,883,010 B2 | 4/2005 | Byrne | |
| 6,944,785 B2 | 9/2005 | Gadir et al. | |
| 6,944,788 B2 | 9/2005 | Dinker et al. | |
| 6,948,089 B2 * | 9/2005 | Fujibayashi | 714/6 |
| 6,986,076 B1 | 1/2006 | Smith et al. | |
| 7,043,665 B2 * | 5/2006 | Kern et al. | 714/5 |
| 7,076,620 B2 * | 7/2006 | Takeda et al. | 711/161 |
| 7,107,418 B2 * | 9/2006 | Ohran | 711/161 |
| 7,107,483 B2 | 9/2006 | Duncan et al. | |
| 7,124,267 B2 * | 10/2006 | Morishita et al. | 711/165 |
| 7,143,307 B1 * | 11/2006 | Witte et al. | 714/6.23 |
| 7,318,133 B2 * | 1/2008 | Yagawa et al. | 711/162 |
| 7,353,335 B2 * | 4/2008 | Kawamura | 711/114 |
| 7,565,501 B2 * | 7/2009 | Mogi et al. | 711/162 |
| 7,634,626 B2 * | 12/2009 | Arakawa et al. | 711/162 |
| 7,644,244 B2 * | 1/2010 | Homma et al. | 711/162 |
| 2002/0049778 A1 * | 4/2002 | Bell et al. | 707/200 |
| 2003/0074600 A1 | 4/2003 | Tamatsu | |
| 2005/0240740 A1 * | 10/2005 | Takeda et al. | 711/162 |
| 2005/0251633 A1 * | 11/2005 | Micka et al. | 711/162 |
| 2006/0218365 A1 * | 9/2006 | Osaki et al. | 711/162 |

* cited by examiner

DATA TRANSFER AND RECOVERY SYSTEM

PRIORITY

This application is a continuation of U.S. application Ser. No. 11/769,544, filed Jun. 27, 2007 now U.S. Pat. No. 7,487,383, which claims the benefit of U.S. Provisional Patent Application 60/817,211, filed on Jun. 29, 2006, each of which is hereby incorporated by reference in its entirety.

FIELD OF THE INVENTION

The present invention generally relates to the backup and recovery of computer systems.

BACKGROUND OF THE INVENTION

Business interruption due to the malfunction or loss of a server at a primary site can be a major problem for large as well as small businesses. Known systems address this issue by using various systems ranging from simple periodic tape drive or disk backups to sophisticated, redundant, mirror systems running the operating systems and applications present on the primary systems. Data changes to the primary system can be frequently transmitted to the one or more secondary sites to keep them updated. In the event of a malfunction or loss of a primary site, users are redirected to a fully functional and updated secondary site. It can be expensive to maintain such functioning and synchronized backup sites. Software licenses for operating systems and applications running on the primary site have to be purchased and maintained for the backup site. The backup site has to be operated and maintained by a support staff.

Malfunction and loss of computer systems can be especially problematic for smaller businesses, which may not have the budget to maintain fully operational, synchronized backup systems. This can be due to prohibitively expensive redundant hardware, operating system and application licenses and the cost of staffing backup operations. Small businesses have been forced to rely on less effective and efficient backup methods, such as tape backup systems or basic remote data storage resources. Such backups can be insufficient and unreliable and can lead to the loss of data and the interruption of business services. Data updates can be infrequent or unreliable and differences between primary and backup hardware and software (e.g., operating system versions, applications, device drivers, etc.) can mean that the backup may not work at the worst possible time, i.e., when it is needed.

Accordingly, what is needed is a cost-effective data backup and recovery system that can provide near-real time data backup and recovery for minimization of business interruption resulting from data system failure without the high costs of a live, redundant, mirror backup system.

BRIEF DESCRIPTION OF THE DRAWINGS

The accompanying drawings illustrate the present invention and, together with the description, further serve to explain the principles of the invention and to enable one skilled in the pertinent art to make and use the invention.

DETAILED DESCRIPTION OF THE INVENTION

Figure 1:
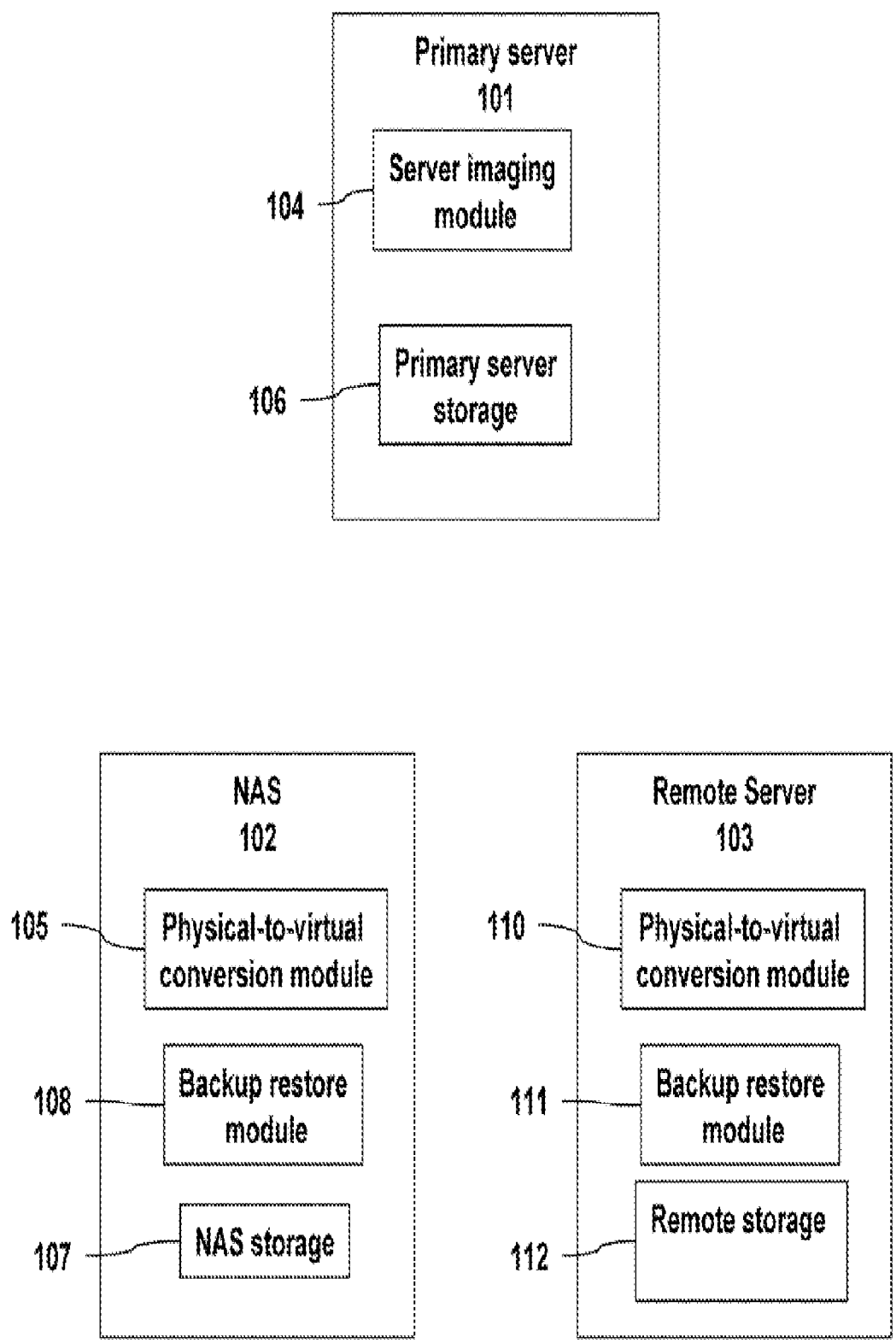
FIG. 1 illustrates a data recovery system according to an embodiment of the present invention.

Embodiments of the present invention can provide a system that can store and regularly update a backup disk image of a primary computer system, including the operating system, applications and data. The disk image can be stored on any suitable device adapted to store digital information, according to the needs of a client. For example, to recover from a failure of a partition, the image can be stored on another partition of the same drive used by the primary system. Alternatively, the image can be stored on an external drive coupled (e.g., via USB) to the primary system. To provide continuity of operations across the loss of the primary site (e.g., due to fire, acts of war, etc.), the image can be stored on a remote system, e.g., thousands of miles away from the primary system.

Backup software on the primary system can cause the primary system to track changes to the primary disk image and send updates (which can be sent periodically, aperiodically or in response to a triggering condition or event) to the backup system. Software at the backup system can update the backup primary image based upon the contents of the updates. In the event of a failure of the primary system, the up-to-date backup image can be loaded onto another system, which when running can essentially duplicate a recent state of the primary system before failure. In one embodiment, the backup primary image and delta images can be used to activate a remote virtual server to which users can be redirected after failure of the primary site. In another embodiment, the primary system can be restored after power is restored or the primary system is repaired. This can be done by loading the backup image onto the repaired primary system and activating it.

At least one of the primary and backup data storage system control modules can coordinate the copying of primary data images to the secondary data storage system, where the secondary data storage system is preferably a backup appliance such as a Network Attached Storage device ("NAS"). As used herein, "storage" can include all or part of a hard disk, RAM, ROM, flash memory, an external drive and any other device adapted to store electronic information. "Primary server storage," "network attached storage device," etc. can include any all or part of any such device that is usable by the primary server, network storage device, etc., respectively. Information may be transferred between the primary and backup data storage system controllers synchronously, when a primary host computer requests writing of data to a primary data storage device, or asynchronously with the primary host computer requesting the writing of data to the primary data storage system, in which case the remote data copying or mirroring is independent of and largely transparent to the primary computer system. Data may also be similarly transferred between the primary or NAS and a remote storage server, thus providing an additional layer of failure protection.

The data in the backup image can include a disk or partition image from the primary server system. The initial image may be a complete compressed block level copy of the primary server's hard drive patterns and can include a boot level backup feature. Once the initial image is transferred, incremental or differential changes can subsequently be composed and sent to the backup device or storage unit. These updates may utilize bandwidth limiting and throttling such that primary server functionality is largely unaffected by the backup work. For example, the updates can be sent as a second or lower priority to functions performed by the primary system. For example, an update transmission can be held while a user at the primary system views a streamed video that requires substantial bandwidth to properly display. The update transmission rate can be slowed while the video is being streamed to prevent interruptions in the viewed video, and then increased when the video is finished and the bandwidth becomes available. The timing of the updates can be controlled by a user or administrator of the primary system.

FIG. 1 illustrates a recovery system according to an embodiment of the present invention. The recovery system includes a primary server 101 coupled to a NAS 102 and a remote server 103. NAS 102 may be coupled to primary server 101 in any suitable way, e.g., direct connection via USB or connected through a network, such as a LAN, WAN, the Internet, etc. Remote server 103 may be connected to NAS 102 and primary server 101 in any suitable was, e.g., through a network such as a LAN, WAN, the Internet, etc. Primary server 101 can include server imaging module 104 and server imaging module 104. Server imaging module 104 can send disk images to NAS 102 and Remote Storage Server 103. Primary server storage can be any device adapted to store digital information, including RAM, ROM, a hard disk, flash memory, etc. Primary server storage 106 can include a hard disk that stores an operating system for primary server 101, as well as application software and data. Primary server storage can be distributed across several devices. For example, the operating system can be stored on a hard disk, while an application can be stored on a CD ROM and certain data can be stored on flash memory. Server imaging module 104 can be stored in primary server storage 106, which can include an adjunct memory device, e.g., a smart card, flash memory, an external hard drive, etc., and can create disk images or partition images and continuous or near continuous incremental or differential images of changes occurring on the primary server storage 106. The initial disk or partition image may be referred to as a primary disk image. The continuous or near continuous incremental or differential images may be referred to as delta images. The primary server 101 can be a customer server or workstation.

Primary server imaging module 104 can compose and send the initial disk image to NAS storage 107 and remote storage 112 or the image can be sent to NAS storage 107 and then passed from NAS to remote storage 112. NAS data storage 107 can be any suitable device adapted to store digital information. Remote data storage 112 can be any suitable device adapted to store digital information. Deltas for the image can be sent from the primary server 101 or the NAS 102 to the remote server.

Server imaging module 104 can also detect differences in primary server storage 106 since the initial disk image was composed and sent to NAS storage 107 and remote storage 112. Server imaging module 104 can package such differences into an update message, which it can send to NAS storage 107 and remote storage 112. Deltas may also be sent to NAS storage 107 and NAS 102 can send the deltas to remote storage 112. Backup restore modules 108 and 111 can update the image of primary server memory 106 that is stored in NAS storage 107 or remote storage 112 by applying an update based upon the update message. Server imaging module 104 can compose and send additional update messages, where each update message can be based upon the differences in primary server storage 106 since the last update was composed and sent. Backup restore module 108 or 111 can apply one or more updates sequentially to create an updated backup image in NAS storage 107 or remote storage 112 of primary server storage 106.

Figure 2:
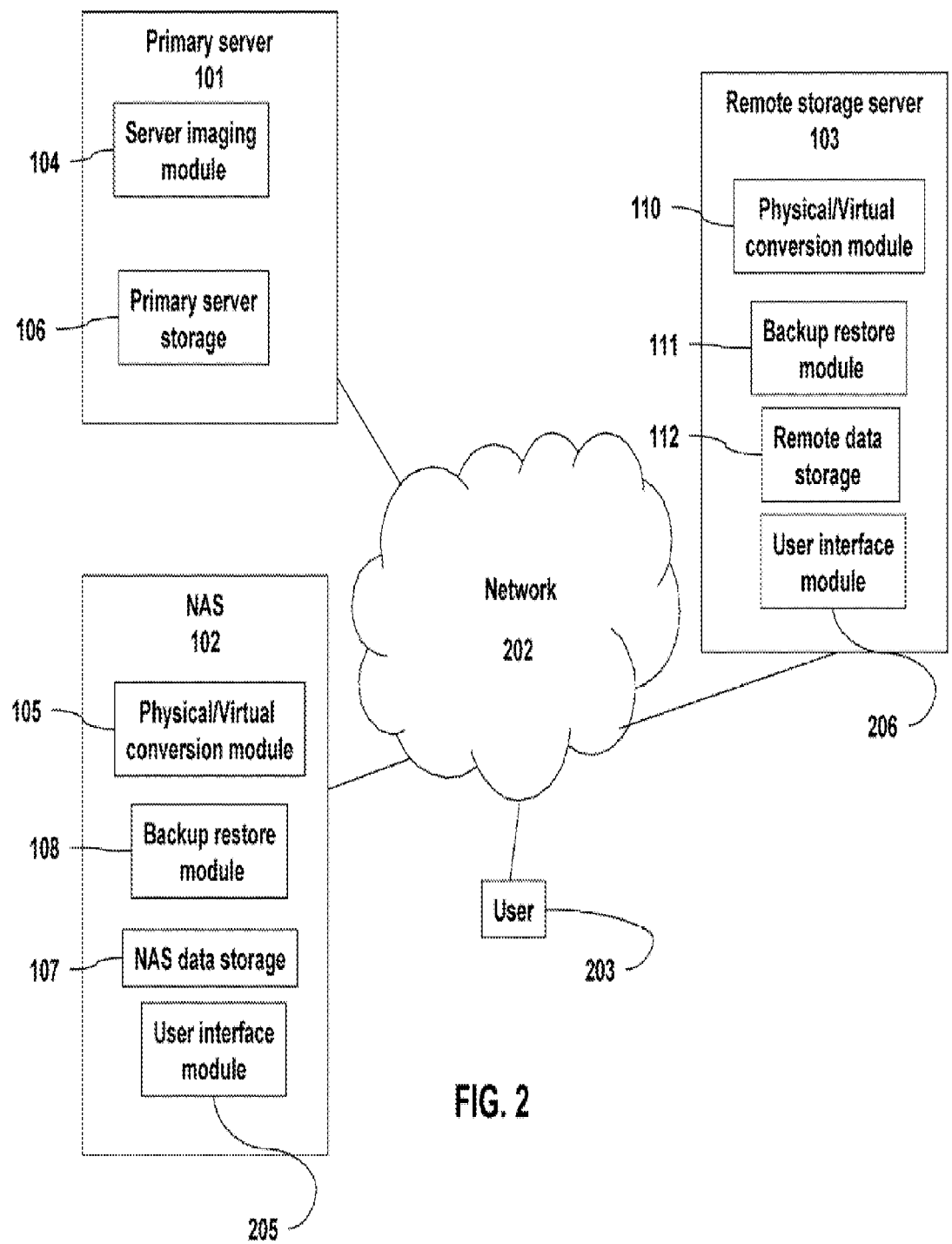
FIG. 2 illustrates a data recovery system according to an alternative embodiment of the present invention.

As shown in FIG. 2, the primary and delta images may be sent to a NAS 102 and remote backup server 103 across network 202, e.g., across the Internet or any other suitable network or combination of networks. Transmission may be accomplished through the use of secure transport software such as a synchronization/augmentation server or programs and protocols such as HTTPS, Secure FTP, FIPS 140-2 validated or any other secure transmission method. The image capture, data back-up process, and incremental updates may run within the operating system level of the physical or virtual machine designated as the primary server with the incremental updates able to be combined into daily updates to minimize data storage requirements and in effect creating an "incremental forever" image of the primary server system. For example, incremental updates of a primary image that are composed and sent every fifteen minutes can be processed and combined into a single update at the end of every 24 hours. The fifteen minute incremental updates can also be stored (e.g., archived) as individual files. The daily update can reflect the net changes to the image that would be equivalent to applying each of the fifteen minute updates in order. At the end of every week, the seven daily updates can be processed and combined into a single week update that similarly reflects the net changes to the image that would be equivalent to applying each of the seven daily updates in order. Similar operations can be undertaken to produce a monthly, quarterly and annual update file that reflects and would be equivalent to the net changes to the image based upon the underlying, more frequent updates. Quarter hour, daily, weekly, quarterly, annual, etc. updates can be archived so that an image can be modified to reflect its state at any of the times available through any of the updates. For example, if an image taken on Jan. 1, 2006 is to be restored to its state on Sep. 24, 2006 at 0045 hours, three quarterly updates can be applied in sequence (updates dated Mar. 1, Jun. 1 and Sep. 1, 2006), then three weekly updates may be applied in sequence (September 7, September 14) and then three fifteen minute updates may be applied (0015, 0030 and 0045). An embodiment of the present invention thus provides a way to create an image based upon a primary image and updates (deltas) at any time for which updates are available. The remote server 103 can have a physical one-to-one ratio with the primary server 101, or can accommodate a plurality of autonomous virtual backup servers, each serving as a failover for its respective primary data storage server. The ability to have a plurality of virtual servers in one data recovery storage device can dramatically reduce costs for small business customers.

Upon failure of the primary server 101, a user 203 can send a failure notification to backup server 103 or NAS 102. Alternatively, the primary server 101 or a third party (e.g., that performs a service monitoring function) can send the failure notification. Upon receiving the notification, the backup restore modules 108 or 111 can apply outstanding delta images to the primary image stored in NAS data storage 107 or remote data storage 112, respectively, thereby creating a reasonably up-to-date image of the primary server 106. In an embodiment, physical/virtual conversion module 105 or 110 can perform a physical-to-virtual ("P2V") conversion to create a virtual server, using the image in NAS storage 107 or remote storage 112. Likewise, physical/virtual conversion module 105 or 110 can perform a virtual-to-physical ("V2P") conversion to create a physical server from a virtual server.

For example, a primary server may be lost due to a disaster or major malfunction, in which case a virtual image is updated, activated and maintained, e.g., updated and itself backed up in accordance with an embodiment of the present invention by storing its image and generating deltas. The virtual image may then be later restored to a different and/or dissimilar (to the failed primary server) hardware and software device by the physical/virtual conversion module 105 or 110 (e.g., a so-called "bare-metal" restore.) In accordance with an embodiment of the present invention, a primary server restoration request can be received to restore a server to a previous state. Physical/virtual conversion module 105 or 110 can perform a virtual to physical conversion of the virtual server on a backup device to create a restoration image. For example, the NAS 102 and/or the remote server 103 can create a restoration image for the primary server. Physical/virtual conversion module 105 or 110 can then perform then restoration of the primary server using the restoration image. Any suitable device (including primary server 101) can be used as the target of a restore operation.

User interface 205 or 206 can be activated and user 203 can be redirected from primary server 101 to NAS 102 or remote server 103. The virtual server can perform the functions of failed primary server 101 until proper repairs or replacements can be made at the primary site, at which time the information may be restored back to the primary server 101. In another embodiment, the backup image may be sent to primary server 101 and restored to primary server storage 106 when primary server 101 recovers, is repaired or replaced, and user can be switched back to primary server 101. In another embodiment, the image may be loaded onto a new server or a NAS, which can then be sent to the location of the failed primary server 101 for replacement.

In accordance with an embodiment of the present invention, only one version of an image is actively used at any one time. This can eliminate the need for multiple software licenses.

Figure 3:
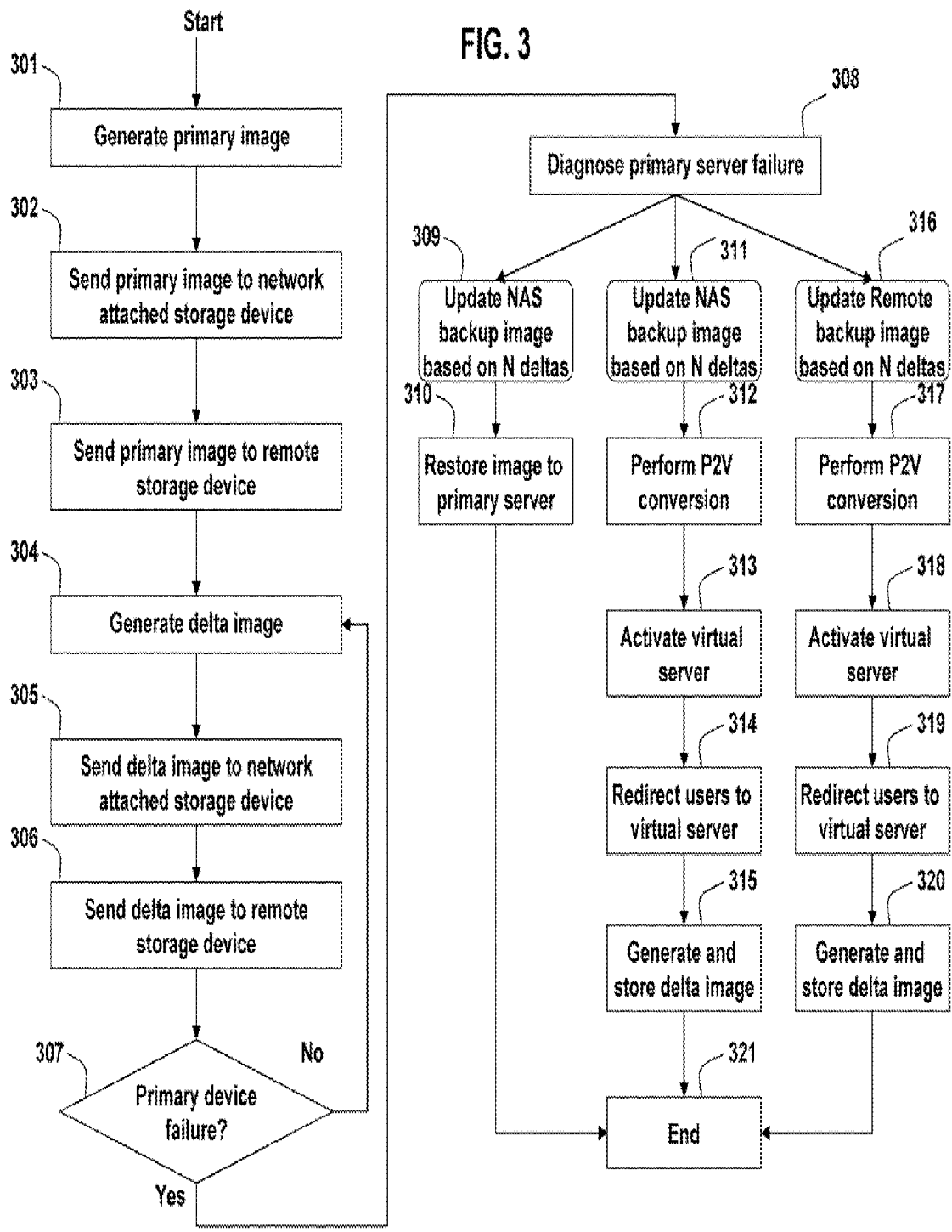
FIG. 3 is a flowchart which illustrates a method of data recovery according to an embodiment of the present invention.

FIG. 3 shows a flowchart illustrating a data recovery method according to an embodiment of the present invention where backup images can be stored both at a NAS and a remote storage device. A primary image can be created at step 301. The primary image can be sent to a NAS at step 302 and a remote storage device at step 303. A delta image can be created at step 304 representing incremental changes in the primary data server. The delta image can be sent to a NAS at step 305 and a remote storage device at step 306. At step 307 a notice of failure of the primary data server can be sent in the event of a failure of the primary data server. If a notice of failure is not sent, the system can return to step 304 and can repeat steps 304 through 306. If a notice of failure is sent, the system can continue to step 308 and the primary server failure can be diagnosed. Depending on the results of the diagnosis, the method may proceed to step 309, 311, or 316. If the diagnosis indicates that the failure is one that may be recovered from the NAS and the NAS is intact, the NAS backup image may be updated at step 309. In an embodiment (not shown), the updated image on the NAS may be converted to a virtual server and activated. Users of the primary server can be redirected to the NAS, which can then perform functions of the primary server until the primary server is restored. If the primary server is repaired, then at step 310 the updated image may be restored to the primary server.

If the diagnosis indicates that the failure is one that cannot be recovered from the NAS and the NAS is intact, the NAS backup image may be updated at step 311. The manner of the update can depend upon the result of the diagnosis. If the primary image is found to be corrupt, an embodiment of the present invention can determine about or exactly the time and/or update at which the image become corrupt. It would be undesirable to propagate to the backup image corrupt elements that are represented in one or more updates of the primary image. Therefore, the backup image can be updated to its state before it became corrupt on the primary server by only applying those updates at most up to the time of corruption. The updates may be applied only to a point well before the time of corruption, if desired. Indeed, the backup can be updated to any state from the time it was created to the time the last update is available in accordance with an embodiment of the present invention. At step 312 the updated image may be converted to a virtual server. The virtual server may then be activated at step 313. At step 314 users of the primary server may be redirected to the virtual server, which can perform the functions of the failed primary server until proper repairs or replacements can be made at the primary site. At step 315 delta images of the virtual server may be generated and stored on the NAS and remote storage device to maintain recovery capability until the primary server is restored.

If the diagnosis indicates a failure of both the primary server and the NAS, the remote backup image may be updated at step 316 as appropriate. At step 317 the updated image may be converted to a virtual server. The virtual server may then be activated at step 318. At step 319 users of the primary server may be redirected to the virtual server, which can perform the functions of the failed primary server until proper repairs or replacements can be made at the primary site. At step 320 delta images of the virtual server may be generated and stored on the remote storage device to maintain recovery capability until the primary server is restored.

Figure 4:
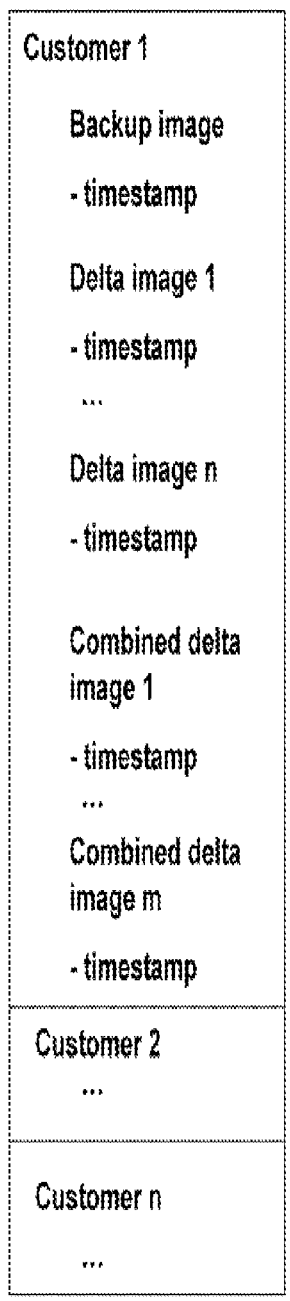
FIG. 4 illustrates a remote data storage system according to an embodiment of the present invention.

FIG. 4 shows a data structure that can be associated with a given backup image, including the backup image and several sequential delta images that reflect incremental changes to the backup image. The backup image can be stored with an index that represents the time at which the image was last updated with a delta image, the identifier of the last delta image that was applied to update the backup, etc. Likewise, each delta image can be associated with a time or an identifier that can be useful in ordering and tracking the implementation of the delta images. Multiple delta images may be periodically combined so that they correspond to an extended period of time, e.g., days, weeks, or months as described above.

In accordance with an embodiment of the present invention, a user can specify portions of a primary image which are or are not to be included in an initial backup image and/or in delta images for a given primary server. For example, a user (acting as an administrator for a primary server) may specify that certain data files, e.g., sensitive files or files which are not important to backup, not be included in the initial backup image or deltas. Thus, different backups can be maintained for a single primary server. The backups can be differentiated by user, by groups of users, by types of user, etc. When the primary server fails, a set of backup images can be restored, each, for example, to its own virtual backup server. When a user is redirected to the backup, the user interface module can direct the user to the appropriate backup server. For example, user interface module 205 or 206 (FIG. 2) can determine to which group a user belongs, which type a user is, the identity of a user, etc., and direct the user to the corresponding virtual server running the backup appropriate for that user. For example, a user can be identified by reading a cookie on the user machine, by receiving user logon credentials, a user type indication, a user group identifier, etc. User interface can use such information to lookup the appropriate virtual server in a table. For example, the lookup table can correlate a particular user with a particular backup image or virtual server, a particular user type with a virtual server, etc.

Figure 5:
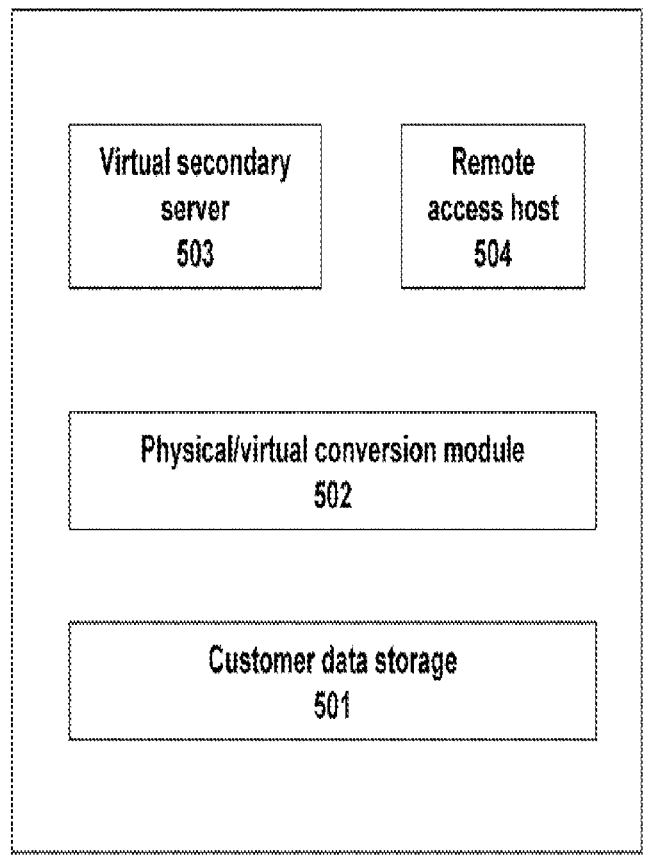
FIG. 5 illustrates a remote data system according to an embodiment of the present invention.

FIG. 5 illustrates a remote storage system according to an embodiment of the present invention. Customer data storage 501 may store multiple sets of primary images and delta images that may be associated with data recovery customers. Physical/Virtual conversion module 502 may perform physical-to-virtual conversions in response to a recovery failure, or virtual-to-physical conversions in response to a request to recover an image to the primary server. Virtual secondary server 503 can act as a replacement for one or more of the failed primary data servers associated with data recovery customers. Remote access host 504 can provide a secure access point for clients of failed primary data servers, who may remotely access the appropriate virtual secondary server 503.

The failover processes to restore operation can be accomplished in minutes versus the possible days of time involved in traditional tape reloads, off site data storage. Several businesses may cooperatively use a single server with large data storage and with multiple virtual machines available for use as backup servers when failures occur. This can reduce the cost of near real time backups that are often prohibitively expensive for small companies and individuals by allowing utilization of only one license for the operating systems and program applications because only a single instance of the server (and thus the licensed software) is operational at any point in time. Furthermore, the invention can provide for a means to restore operations to new primary server hardware in the event of a catastrophic failure that can be hardware independent and allow fast, seamless installation and business continuity.

While various embodiments of the present invention have been described above, it should be understood that they have been presented by way of example and not limitation. It will be apparent to one skilled in the pertinent art that various changes in form and detail can be made therein without departing from the spirit and scope of the invention.

What is claimed is:

1. A system comprising:
   (a) a primary server at a first location, the primary server comprising:
      (i) a server imaging module to generate an image of the primary server, the image providing a complete state of the primary server and convertible to a virtual machine configured to replace the primary server; and
      (ii) a primary computer-readable storage to store the image of the primary server generated by the server imaging module;
   (b) an attached computer-readable storage device comprising:
      (i) an attached computer-readable storage to store the image of the primary server; and
      (ii) an attached physical-to-virtual conversion module configured to convert the image of the primary server to a virtual machine; and
   (c) a remote server at a second location remote from the first location, the remote server comprising:
      (i) a remote computer-readable storage to store the image of the primary server; and
      (ii) a remote physical-to-virtual conversion module configured to perform at least one of:
         converting the image of the primary server to a virtual machine, and
         receiving a pre-converted primary server image
   wherein the remote server is configured to execute the virtual machine converted from the image of the primary server to replace the primary server only after a failure of the primary server.

2. The system of claim 1, wherein the attached computer-readable storage device is connected to the primary server via a direct connection.

3. The system of claim 2, wherein the attached computer-readable storage device is internal to the primary server.

4. The system of claim 2, wherein the attached computer-readable storage device is external to the primary server.

5. The system of claim 1, wherein the attached computer-readable storage device is connected to the primary server via a network connection.

6. The system of claim 1, said server imaging module being configured to send the image of the primary server to the attached computer-readable storage device, the remote server, or both.

7. The system of claim 1, said attached computer-readable storage device being configured to send the image of the primary server to the remote server.

8. The system of claim 1, said server imaging module further comprising a difference detection module configured to detect differences in the primary server, and to generate an update message including the detected differences.

9. The system of claim 8, said difference detection module further configured to send the update message to the attached computer-readable storage device, the remote server, or both.

10. The system of claim 9, said remote server further comprising a backup restore module configured to apply one or more updates described by the update message to a stored image of the primary server, to generate an updated backup image of the primary server.

11. The system of claim 8, said attached physical-to-virtual conversion module further configured to generate an updated version of the virtual machine based upon one or more updates described by the update message.

12. The system of claim 8, said remote physical-to-virtual conversion module further configured to generate an updated version of the virtual machine based upon one or more updates described by the update message.

13. The system of claim 1, wherein the primary server and the remote server are connected via a secure network connection.

14. The system of claim 1, said remote server further comprising a user interface capable of being activated in response to a user being diverted from the primary server to the remote server.

15. The system of claim 14, said user interface providing a user access to a virtual machine operating on the remote server, the virtual machine duplicating functionality of the primary server.

16. The system of claim 15, wherein the virtual machine is generated by the remote server from an image of the primary server stored in the remote computer-readable storage.

17. The system of claim 1, wherein the attached physical-to-virtual conversion module is configured to convert the image of the primary server to the virtual machine periodically.

18. The system of claim 1, wherein the attached physical-to-virtual conversion module is configured to convert the image of the primary server to the virtual machine in response to a failure of the primary server.

19. The system of claim 1, wherein the remote physical-to-virtual conversion module is configured to convert the image of the primary server to the virtual machine periodically.

20. The system of claim 1, wherein the remote physical-to-virtual conversion module is configured to convert the image of the primary server to the virtual machine in response to a failure of the primary server.

21. A system comprising:

a backup generator configured to create a backup of a first server;

a physical-to-virtual converter configured to convert the backup of the first server to a virtual machine capable of replicating functionality of the first server subsequent to a failure of the first server; and a second server configured to run the virtual machine starting from a state of the first server prior to the failure of the first server, to present the functionality of the first server to a user of the first server.

22. The system of claim 21, further comprising a difference generator to create a delta file based on a change in the first server.

23. The system of claim 22, wherein the system is configured to generate an updated virtual machine based upon the delta file.

24. The system of claim 21, wherein the backup of the first server is an image of the first server.

25. The system of claim 21, further comprising a local storage unit to store the image of the first server.

26. The system of claim 21, wherein the second server is located remotely from the first server.

27. The system of claim 21, wherein the physical-to-virtual conversion module is configured to convert the backup of the primary server to the virtual machine subsequent to a failure of the primary server.

* * * * *